United States Patent
Lieleg et al.

(10) Patent No.: US 10,604,448 B2
(45) Date of Patent: Mar. 31, 2020

(54) ENGINEERED HYBRID CEMENT-BASED COMPOSITION WITH INCREASED WETTING RESISTANCE

(71) Applicant: Technische Universität München, München (DE)

(72) Inventors: Oliver Lieleg, Garching (DE); Dionis Minev, Fernwald (DE); Christian Grosse, Olching (DE)

(73) Assignee: Technische Universität München, München (DE)

( * ) Notice: Subject to any disclaimer, the term of this patent is extended or adjusted under 35 U.S.C. 154(b) by 86 days.

(21) Appl. No.: 15/773,486

(22) PCT Filed: Oct. 18, 2016

(86) PCT No.: PCT/EP2016/074956
§ 371 (c)(1),
(2) Date: May 3, 2018

(87) PCT Pub. No.: WO2017/076635
PCT Pub. Date: May 11, 2017

(65) Prior Publication Data
US 2018/0334408 A1  Nov. 22, 2018

(30) Foreign Application Priority Data

Nov. 6, 2015 (EP) .................................... 15193477

(51) Int. Cl.
| | | |
|---|---|---|
| C04B 24/00 | (2006.01) | |
| C04B 28/02 | (2006.01) | |
| C04B 28/10 | (2006.01) | |
| C04B 24/14 | (2006.01) | |
| C04B 103/65 | (2006.01) | |
| C04B 103/00 | (2006.01) | |
| C04B 111/27 | (2006.01) | |

(52) U.S. Cl.
CPC .............. *C04B 24/00* (2013.01); *C04B 24/14* (2013.01); *C04B 28/02* (2013.01); *C04B 28/10* (2013.01); *C04B 2103/0001* (2013.01); *C04B 2103/65* (2013.01); *C04B 2111/27* (2013.01)

(58) Field of Classification Search
CPC ......... C04B 24/00; C04B 24/14; C04B 28/02; C04B 28/10; C04B 2103/65; C04B 2103/0001; C04B 2111/27
See application file for complete search history.

(56) References Cited

U.S. PATENT DOCUMENTS

2014/0315765 A1* 10/2014 McDaniel .............. C09K 8/582
507/201

FOREIGN PATENT DOCUMENTS

| DE | 695 06 797 | | 7/1999 |
|---|---|---|---|
| EP | 0 177 824 | | 4/1986 |
| EP | 0 913 370 | | 5/1999 |
| EP | 2 202 210 | | 6/2010 |
| JP | 07232946 A | * | 9/1995 |
| KR | 100876676 B1 | * | 1/2009 |
| KR | 10-2009-0108684 A | * | 10/2009 |
| WO | WO 2007/051833 | | 5/2007 |
| WO | WO 2014/093421 | | 6/2014 |
| WO | WO 2014/176061 | | 10/2014 |

OTHER PUBLICATIONS

Bayry, et al, Hydrophobins—Unique Fungal Proteins, PLOS 8(5):e1002700 (2012).
Branda, et al, A major protein component of the Bacillus subtilis biofilm matrix, Molecular Microbiology, 59(4):1229-1238 (2006).
International Search Report issued in PCT/EP2016/074956 dated Dec. 21, 2016.
Kobayashi, et al, BsIA (YuaB) forms a hydrophobic layer on the surface of Bacillus subtilis biofilms, Molecular Microbiology 85(1):51-66 (2012).
http://www.uniprot.org/uniprot/A0A063XD50#A0A063XD50-1.
http://www.uniprot.org/uniprot/Q5ND72#Q5ND72-1.

* cited by examiner

*Primary Examiner* — Anthony J Green
(74) *Attorney, Agent, or Firm* — Knobbe, Martens, Olson & Bear LLP (57) ABSTRACT

The present invention relates to a hydrophobic cement-based material composition comprising a bacterial biofilm, or at least one hydrophobicity-conveying component of a bacterial biofilm, an additive for a cement-based material composition comprising a bacterial biofilm or at least one hydrophobicity-conveying component of a bacterial biofilm and the use of such biofilm or component therefore for decreasing the wettability of a cement-based material.

18 Claims, 4 Drawing Sheets

ENGINEERED HYBRID CEMENT-BASED COMPOSITION WITH INCREASED WETTING RESISTANCE

RELATED APPLICATIONS

This application is the U.S. national phase entry of PCT App. No. PCT/EP2016/074956 filed Oct. 18, 2016 which was published in English as WO 2017/076635 on May 11, 2017 which claims priority to EP App No. 15193477.5 filed Nov. 6, 2015 which is incorporated herein by reference in its entirety.

FIELD OF THE INVENTION

The present invention relates to a hydrophobic cement-based material composition comprising a bacterial biofilm, or at least one hydrophobicity-conveying component of a bacterial biofilm, and the use of such biofilm or component therefore for decreasing the wettability of a thus prepared cement-based material.

BACKGROUND OF THE INVENTION

Cement-based materials (CBMs) such as mortar and concrete are the materials most frequently used by the building industry. Per year an amount of 10 billion tons of concrete is produced, highlighting the economic relevance of CBMs. In Germany up to 28 billion Euros are going to be spent in repair and maintenance works on railway bridges, mostly by replacing corroded or damaged concrete structures. A main cause of CBM damage is water penetration which is considered as perpetual problem in civil engineering. CBMs typically suffer from invading water which corrodes load-bearing elements that are integrated into the volume of the material. Micro cracks, e.g. due to freeze-thaw-cycles, and the porous material property render the cementitious material further vulnerable towards water ingress and expose building structures to large quantities of water intake over time. Absorbed water further promotes corrosion on
the embedded steel structures (Bentur et al., Steel Corrosion in Concrete: Fundamentals and civil engineering practice. Spon, 1997).

Existing strategies to render cement-based materials more water-resistant often require a surface treatment of the material after the casting process and the use of organic solvents to achieve a bulk modification of the CBMs with hydrophobic agents. In particular, silane-based additives such as alkoxysilane, alkoxysiloxane, alkali siloconate or silicone resins are used for subsequently hydrophobizing CBMs, as disclosed, for example, in WO 2007/051833 or EP 0177824. Such a modification after the casting process is supposed to reduce the water ingress. However, in order to be efficient, the modification of the material surface has to be complete and without any gaps. It is hence costly and time consuming. Moreover, silane-based hydrophobic agents often require the use of organic solvents which may evaporate from the materials over a prolonged period of time and may thus constitute a potential health hazard.

There is thus a need for an alternative approach to provide cement-based materials with increased wetting resistance which does not require a laborious post-processing or may lead to health or environmental problems over a long period of time. The process to provide said cement-based material should be economical, safe and suitable to prepare large batches of material suitable for a variety of applications.

OBJECTS AND SUMMARY OF THE INVENTION

The present invention addresses this need and provides a hydrophobic cement-based material composition, wherein said composition comprises a bacterial biofilm, or at least one hydrophobicity-conveying component of a bacterial biofilm. It was surprisingly found by the inventors that the addition of a biological component comprising a bacterial biofilm or components thereof to a cement-based material composition, e.g. mortar or concrete, generates a specific surface structure with increased micro- and nanoscopic roughness which drastically reduces the wettability of the material and thus renders it hydrophobic. In contrast to the approaches of the prior art as mentioned above, the approach of the invention is based on a modification of the cement-based material as such and therefore does not require a supplementary or additional treatment of the material's surface to achieve the hydrophobicity-conveying effect per se.

The bacterial biofilm or the hydrophobicity-conveying component thereof may be provided in the form of an additive to be mixed with the cement-based material.

In a preferred embodiment of the invention the bacterial biofilm or the additive is supplemented to the cement-based material composition in an amount of about 0.5 wt. % to about 20 wt. % of the dry weight of the final composition. It is more preferred that the biofilm is supplemented to the cement-based material composition in an amount of about 1 wt. % to about 10 wt. % of the dry weight of the final composition. It is particularly preferred that the biofilm is supplemented to the cement-based material composition in an amount of about 1 wt. % to about 5 wt. % of the dry weight of the final composition. In an even more preferred embodiment the additive is supplemented to the cement-based material composition in an amount of about 2 wt. % of the dry weight of the final composition. In another preferred embodiment the additive is supplemented to the cement-based material composition in an amount of about 5 wt. % of the dry weight of the final composition.

In yet another aspect the present invention relates to the use of a bacterial biofilm, or of at least one hydrophobicity-conveying component of a bacterial biofilm for the preparation of a hydrophobic cement-based material composition.

A further aspect of the invention is directed to the use of a bacterial biofilm, or of at least one hydrophobicity-conveying component of a bacterial biofilm for decreasing the wettability of a cement-based material composition.

In a further aspect the present invention relates to method for rendering a cement-based material composition hydrophobic, comprising the addition of an effective amount of a bacterial biofilm, or of at least one hydrophobicity-conveying component of a bacterial biofilm to the cement-based material composition.

In a specific embodiment of the composition, use or method of the present invention as defined herein above, the amount of bacterial biofilm (biofilm content; bc) in the cement-based material composition is between about 0.5 wt. % to about 20 wt. % of the dry weight of the final composition. It is preferred that the amount of bacterial biofilm in the cement-based material composition is between about 1 wt. % to about 15 wt. %. It is more preferred that the amount of bacterial biofilm in the cement-based material composition is between about 1 wt. % to about 10 wt. %. It is particularly preferred that the amount of bacterial biofilm in the cement-based material composition is between about 1 wt. % to about 5 wt. %. In an even more preferred embodiment, the amount of bacterial biofilm in the cement-based material composition is about 2 wt. % of the dry weight of the final composition. In another preferred embodiment, the amount of bacterial biofilm in the cement-based material composition is about 5 wt. % of the dry weight of the final composition.

In a preferred embodiment of the composition, use, or method of the present invention as mentioned above, the bacterial biofilm is a biofilm comprising, essentially consisting of, or consisting of bacteria of the species *Bacillus subtilis* and/or of the genus *Pseudomonas*. In more preferred embodiments, said bacteria are bacteria of *Bacillus subtilis* 3610, *Bacillus subtilis* natto, *Pseudomonas fluorescens* and/or *Pseudomonas putida*. Particularly preferred are bacteria of *Bacillus subtilis* 3610.

In a further preferred embodiment of the present invention said bacteria are wildtype bacteria. In yet another preferred embodiment, said bacteria are genetically modified bacteria. The genetic modification may lead to an alteration, preferably an increase, in the biofilm production; an alteration, preferably an increase, in the expression of hydrophobic extracellular biofilm components and/or an improvement of the amenability of the biofilm or of biofilm components.

In another preferred embodiment of the present invention the bacterial biofilm as mentioned herein above is obtained by growing bacteria in a liquid culture medium, or on solid surfaces. It is particularly preferred that said bacteria are grown on agar plates. It is even more preferred that said bacteria are grown on LB-agar plates or $LB^{plus}$ agar plates. A bacterial biofilm obtained according to the present invention may, in a further specific embodiment, by lyophilized.

In yet another preferred embodiment of the composition, use or method according to the present invention as described above, said hydrophobic cement-based material composition exhibits an increased surface roughness in comparison to a cement-based material composition not comprising a bacterial biofilm, or in comparison to a cement-based material composition not comprising at least one hydrophobicity-conveying component of a bacterial biofilm.

In a further preferred embodiment of the composition, use or method according to the present invention as described above, said hydrophobic cement-based material composition exhibits an increased density of elongated spike-like structures on its surface in comparison to a cement-based material composition not comprising a bacterial biofilm, or in comparison to a cement-based material composition not comprising at least one hydrophobicity-conveying component of a bacterial biofilm. In a particularly preferred embodiment of the present invention said elongated spike-like structures cover about 50 to 90% or more of the composition's entire surface.

In a further preferred embodiment of the composition, use or method according to the present invention as described above said hydrophobic cement-based material composition is hydrophobic vis-à-vis soft water, salt water and/or alcohol-water mixtures. In a further specific embodiment, said hydrophobic cement-based material composition forms a contact angle θ with a droplet of soft water, salt water or an alcohol-water mixture of about 90°. In a particularly preferred embodiment, said contact angle θ is of about 90° to 120°.

In yet another preferred embodiment of the present invention, said hydrophobic cement-based material composition comprises or essentially consists of a mortar, a hydraulic concrete, a non-hydraulic concrete or a lime cement plaster.

In a further preferred embodiment of the composition, use or method according to the present invention said hydrophobic cement-based material has a water-to-cement ratio (wc) of about 0.3 to about 0.7. In a more preferred embodiment said water-to-cement ratio is about 0.4 to about 0.6. In an even more preferred embodiment, said water-to-cement ratio of the hydrophobic cement-based material is about 0.5.

BRIEF DESCRIPTION OF THE DRAWINGS

FIG. 1 (A): When 1% of *Bacillus subtilis* biofilm is added to standard mortar (left) during sample generation, the hybrid material (right) become hydrophobic; when a water drop is placed onto the hybrid mortar, the water does not immediately spread any more. FIG. 1 (B): Schematic representation of the production process of hydrophobic hybrid mortar. The water repellent properties of the hybrid material are also obtained when a hydrophilic biofilm variant is used as an admixture. Images were acquired immediately after the water drops have been placed onto the mortar surfaces. The biofilms were cultivated on 1.5% (w/v) agar plates enriched with LB (Luria/Miller) or $LB^{plus}$ medium as follows: Overnight cultures of the bacterial strain were obtained from frozen glycerol stocks by inoculation in 15 mL LB medium for 16 hours in a shaking incubator at 30° C. 100 µL of the overnight culture was then plated onto the agar plates and incubated for 24 hours at 30° C. Images for contact angle analysis were acquired from a lateral view with a commercial digital camera mounted onto a perimeter stand and equipped with a varifocal lens. The evaluation of the contact angle was performed using the image analysis software ImageJ with a drop snake analysis plug-in tool (adapted from A. Stalder, G. Kulik, D. Sage, L. Barbieri, and P. Hofmann, "A snake-based approach to accurate determination of both contact points and contact angles", Colloids and Surfaces A: Physicochemical and Engineering Aspects, 2006). Biofilm-enriched hybrid-mortar samples were cured at room temperature for 4 days before contact angle measurements were performed.

FIG. 2 (A)) and light profilometry images (acquired on a µSurf Profilometer, NanoFocus AG, Oberhausen, Germany; FIG. 2 (B)) of unmodified (left) and hybrid-mortar (right) surfaces. The hybrid-mortar sample exhibits strongly altered surface characteristics both on the outer surface and on the inner surface of the material.

FIG. 3 A: Hybrid mortar samples with different amounts of biofilm both in freshly harvested an in lyophilized form, and w/c values are compared. At a w/c ratio of 0.5, the contact angle is the highest when 2% (w/w) of biofilm is added. When the w/c ratio is varied or when lyophilized biofilm is used instead of freshly harvested biofilm, the hydrophobic properties of the hybrid mortar samples are maintained. When lyophilized biofilm is used at a w/c ratio of 0.5, the contact angle is the highest when 10% (w/w) of biofilm is added. The high wetting resistance is also observed towards wetting with sea water (600 mM NaCl). FIG. 3 B: The contact angle of water on hybrid mortar only weakly decreases over time. Unmodified mortar is immediately wetted whereas selected hybrid samples show even higher wetting resistance than polytetrafluoroethylene (PTFE, brand name: teflon). Error bars denote the standard error of the mean.

DETAILED DESCRIPTION OF THE EMBODIMENTS

Although the present invention will be described with respect to particular embodiments, this description is not to be construed in a limiting sense.

Before describing in detail exemplary embodiments of the present invention, definitions important for understanding the present invention are given.

As used in this specification and in the appended claims, the singular forms of "a" and "an" also include the respective plurals unless the context clearly dictates otherwise In the context of the present invention, the terms "about" and "approximately" denote an interval of accuracy that a person skilled in the art will understand to still ensure the technical effect of the feature in question. The term typically indicates a deviation from the indicated numerical value of ±20%, preferably ±15%, more preferably ±10%, and even more preferably ±5%.

It is to be understood that the term "comprising" is not limiting. For the purposes of the present invention the term "consisting of" or "essentially consisting of" is considered to be a preferred embodiment of the term "comprising of". If hereinafter a group is defined to comprise at least a certain number of embodiments, this is meant to also encompass a group which preferably consists of these embodiments only.

Furthermore, the terms "(i)", "(ii)", "(iii)" or "(a)", "(b)", "(c)", "(d)", or "first", "second", "third" etc. and the like in the description or in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms relate to steps of a method or use there is no time or time interval coherence between the steps, i.e. the steps may be carried out simultaneously or there may be time intervals of seconds, minutes, hours, days, weeks etc. between such steps, unless otherwise indicated.

It is to be understood that this invention is not limited to the particular methodology, protocols, reagents etc. described herein as these may vary. It is also to be understood that the terminology used herein is for the purpose of describing particular embodiments only, and is not intended to limit the scope of the present invention that will be limited only by the appended claims. Unless defined otherwise, all technical and scientific terms used herein have the same meanings as commonly understood by one of ordinary skill in the art.

As has been set out above, the present invention concerns in one aspect a hydrophobic cement-based material composition, wherein said composition comprises a bacterial biofilm, or at least one hydrophobicity-conveying component of a bacterial biofilm. The term "hydrophobic" as used herein refers to the property of an increased wetting resistance and reduced wettability of the composition according to the invention. "Hydrophobicity" on a surface is typically understood as limited wettability of a liquid that is situated on a solid surface. Rough topography and composition of the surface are assumed to play an essential role in creating a hydrophobic surface. A water droplet situated on a hydrophobic surface tends to establish the lowest possible energy state. By forming an almost spherical shape on the surface and establishing a minimum surface area for a fixed volume such a low energy state can be achieve. Hydrophobicity can be quantified according to any means known to the skilled person. It is preferred to quantify it according to the contact angle formed by drops on a surface. Said contact angle is generally defined for smooth surfaces according to Young's equation [Eq. 1], depicted below $$\cos(\theta) = (\gamma_{sv} - \gamma_{sl})/\gamma_{lv} \quad \text{[Eq. 1]}$$

In this equation $\gamma_{sv}$, $\gamma_{sl}$ and $\gamma_{lv}$ characterize the interfacial free energies per unit area of the solid-vapor (sv), solid-liquid (sl) and liquid-vapor (lv) interfaces. For non-smooth surfaces, e.g. rough surfaces as assumed to be largely present in cement-based material compositions, a modified Young's equation (Wenzel's equation), as depicted below, applies:

$$\cos(\theta') = r(\gamma_{sv} - \gamma_{sl})/\gamma_{lv} \quad \text{[Eq. 2]}$$

Wenzel's equation introduces a roughness factor $r > 1$ which describes the ratio of the rough area to the projected smooth area. For the purpose of the present invention hydrophobicity is preferably calculated as contact angle according to Wenzel's equation [Eq. 2] or derivatives thereof.

In preferred embodiments a cement-based material composition, wherein said composition comprises a bacterial biofilm, or at least one hydrophobicity-conveying component of a bacterial biofilm, has a contact angle θ with a droplet of liquid of about 90° or more. For example, the contact angle may be about 90° to about 120°, e.g. about 90°, 95°, 100°, 105°, 110°, 115°, 120° or any value in between these values. In further embodiments, the contact angle may be more than 120°, e.g. 125°, 130°, 135°, 140°, 145°, 150° or more. In preferred embodiments, the contact angle is essentially stable over a period of time. In preferred embodiments, the droplet of liquid may be a droplet of soft water, a droplet of salt water or a droplet of an alcohol-water mixture. In the context of the measurement of contact angles "water" or "soft water" refers to supply water or to pure water, e.g. double-distilled water (ddH$_2$O). The term "salt water" refers in this context to water with a typical salt content of seawater, preferably of about 3.5 wt % of NaCl, more preferably of about 600 nM NaCl in ddH$_2$O. An "alcohol-water mixture" as used herein above refers to a mixture of ddH$_2$O and ethanol, preferably comprising about 80% to about 0.05% ethanol. For instance, the alcohol-water mixture may comprise about 75%, 70%, 65%, 60%, 50%, 40%, 30%, 20%, 10% or 5% ethanol or any amount in between these values. In particularly preferred embodiments a cement-based material composition comprising a bacterial biofilm, or comprising at least one hydrophobicity-conveying component of a bacterial biofilm has a contact angle θ of 90° or more with a droplet of ddH$_2$O, a droplet of salt water comprising about 3.5 wt % NaCl, or a droplet of an alcohol-water mixture comprising 70% alcohol.

The contact angle may be measured with any suitable technique known to the person skilled in the art. For example, the measurement may be performed with a measurement setup comprising a perimeter stand with a camera mount, which is adjustable on the vertical and horizontal axis, a camera, preferably with a high resolution lens. In addition, the setup may comprise a light source such that light is directed from above with a slight declination, for optimal lighting conditions. The measurement may be performed at a defined temperature, preferably at room temperature, by placing a defined volume of liquid, e.g. one or more droplets of 10 to 20 μl ddH$_2$O onto the surface of a cement-based material composition. The liquid droplets may be placed at different positions, e.g. at 2, 3, 4 or more different positions of the material composition. Preferably, there should be a spacing of about 3-5 mm between each droplet across the diameter. Immediately after the liquid droplets are placed onto the surface, a first image is taken. Subsequently, e.g. after one or more defined time intervals of, for instance, 3 min, 4 min, 5 min, 10 min etc. further images are recorded, allowing to document the contact angle behaviour over time. Recorded images may subsequently be analysed by determining the contour of liquid droplets, e.g. by tracing the droplet contour with a spline tool, which allows to directly determine a contact angle at the three-phase junction. In a particularly preferred embodiment, the measurement may be performed as described in Example 2 herein below. Further methods to determine the contact angle θ as known to the skilled person and derivable from suitable literature sources such as T. T. Chau, "A review of factors that affect contact angle and implications for flotation practice", Minerals Engineering, 22, 213-219, 2009; or A. W. Neumann and R. J. Good, "Techniques of Measuring Contact Angles", Surface and Colloid Science, Vol. 11, Experimental Methods, 1979, are also envisaged.

The term "cement-based material" as used herein refers to any material which comprises a certain amount of cement. Typically, cement-based material is distinguished by its property to be used in the presence of water into hydraulic and non-hydraulic cements. Non-hydraulic cements are typically composed of calcium hydroxide and harden by carbonation in the presence of carbon dioxide under dry conditions. Hydraulic cements, which can harden in the air or under wet conditions, are typically composed of a mixture of silicates and oxides such as 2CaO.SiO$_2$, 3CaO.SiO$_2$, 3CaO.Al$_2$O$_3$ and 4CaO.Al$_2$O$_3$Fe$_2$O$_3$. Furthermore, the mixture may comprise sulfates. Cement is typically present in the form of grains whose diameter may vary from the sub-micron range, up to 100 μm. Upon mixing with water a hydration process starts which leads to the generation of crystals, in particular of fibrous calcium silicate hydrate crystals, and calcium hydroxide and calcium oxide.aluminum oxide.iron oxide hydrate crystals. In the presence of sulfates, typically ettringite crystals and mono-sulfate (also referred to as hydration crystallites) develop, e.g. at the surface of the material.

A preferred cement included in a cement-based material according to the present invention is slaked lime as non-hydraulic cement. A preferred hydraulic cement is Portland cement. Also envisaged are alternative cements such Portland cement blends including blast furnace cement, silica fume cement, pozzolan cement, flyash cement, as well as trass cement, white cements. Further cement types, blends and mixtures, which are also envisaged by the present invention, would be known to the skilled person or could be derived from suitable literature sources such as A. M. Neville, Properties of Concrete, 5. Edition, 2011.

Cement-based material compositions according to the present invention may, in addition to cement as described herein above, comprise water and additional components. For example, cement-based material composition may comprise sand grains up to a size of 4 mm, or larger grains of a size of more than 4 mm. Cement-based material compositions comprising sand grains smaller than 4 mm are referred to as "mortars" or "mortar mixtures". Cement-based material compositions comprising sand or gravel grains of more than 4 mm, e.g. 5, 10, 15, 20, 25 mm or more are referred to as "concrete". Concrete may, in certain embodiments, comprise construction aggregate, i.e. a coarse material with particle sizes of more than 4 mm including sand, gravel, crushed rocks or stones such as crushed granite or crushed limestone, or recycled material. Cement-based material compositions comprising, in addition to cement, lime or Ca(OH)$_2$ and sand grains smaller than 4 mm are referred to as "lime cement plaster". In preferred embodiments, the cement-based material composition according to the invention is, comprises, or essentially consists of mortar, concrete or lime cement plaster. Mortar and concrete compositions may be provided as hydraulic or non-hydraulic variants, e.g. depending on the use of hydraulic or non-hydraulic cements as defined herein above.

The consistency of cement-based material compositions according to the present invention depends to a certain degree on the amount of water present, i.e. the ratio of the weight of water and the weight of cement (w/c) in the composition. This weight ratio of water and cement is typically determined according to the following formula:

$$w/c = \frac{m_{H_2O}}{m_{Cement}}, \left[\frac{g}{g}\right] \qquad [\text{Eq. 3}]$$

In specific embodiments cement-based material compositions according to the invention may have a water-to-cement ratio (w/c) of about 0.3 to about 0.7, e.g. a w/c of about 0.3, 0.35, 0.4, 0.45, 0.5, 0.55, 0.6, 0.65, or 0.7, or of any value in between these values. In preferred embodiments, cement-based material compositions according to the invention may have a w/c ratio of about 0.4 to about 0.6. In a particularly preferred embodiment, the cement-based material compositions according to the invention may have a w/c ratio of about 0.5. The w/c ratio of the material may be adjusted according to the intended use, as well as implementation or climatic considerations. For example, in order to increase strength and durability of the composition a lower ratio, e.g. 0.3, 0.4 or 0.45 may be employed. Processing difficulties at such low ratios may be overcome by the addition of additives such as plasticizers or superplasticizers to increase flow ability. A high w/c ratio of about 0.65 or 0.7 may lead to a segregation of cement from other components of the composition, e.g. sand grains and may provide a composition which comprises water not consumed by hydration. Such a composition may have an increased number of microscopic pores, cracks and fractures and may show a tendency to shrink over time. A high w/c ratio may accordingly be used to reduce the final strength of the cement-based material composition.

In specific embodiments, cement-based material compositions according to the invention may comprise additional components or additives. For example, the compositions may comprise chemical admixtures which may have an influence on the rate with which the composition hardens, or on the tensile strength of the composition. Suitable admixtures envisaged by the present invention are accelerators which speed up the cement hydration process such as $CaCl_2$, $Ca(NO_3)_2$ or $NaNO_3$; retarders, which slow the cement hydration process such as glucose, sucrose, tartaric acid or citric acid. Also envisaged are air entrainments which add and entrain air bubbles and thus help reducing damage to the composition during freeze-thaw cycles. Suitable air entrainments are, for example, surfactants. Further additives, to be used in combination with any of the above, or alone, are plasticizers such as lignosulfate, or superplasticizers such as polycarboxylate ether based superplasticizers (PCEs); or pigments to change the colour of the composition. A further envisaged chemical additive is a corrosion inhibitor, e.g. hydrazine, hexamine or phenylenediamine; an anitoxidant such as sulfite; or a bonding agent, which may be used to link previously present composition layers with new material. A further class of additives which may be present in cement-based material compositions according to the present invention are mineral admixtures. Examples of mineral admixtures are fly ash, ground granulated blast furnace slag (GGBFS/GGBS), silica fume or high reactivity metakaolin (HRM). Cement-based material compositions according to the present invention, in particular concrete compositions may further comprise reinforcements. Such reinforcements increase the material's tensile strength and may be embedded within the composition. Examples of reinforcement to be employed in the context of the present invention include steel bars, steel meshes or steel wires, steel fibers, glass fibers, and fibers or meshes out of plastic or textile materials.

The term "bacterial biofilm" as used herein refers to a multicellular community of one or more species of bacterial microorganisms, preferably apathogen bacterial microoganisms, embedded in a protective self-encapsulating extracellular biopolymer matrix. The extracellular biopolymer matrix is typically composed of polysaccharides, proteins, and/or nucleic acids which are produced by the bacteria. It is assumed that within a bacterial biofilm a heterogeneous population of individual cells exists, wherein said cells may have followed different developmental pathways. The present invention envisages the use of any suitable bacterial biofilm as component of a hydrophobic cement-based material composition, or as additive to said cement-based material composition. A suitable bacterial biofilm may, for example, be a biofilm which demonstrates hydrophobic properties. Another suitable biofilm may, for example, be a biofilm which demonstrates hydrophilic properties. Preferably, a suitable bacterial biofilm may show a contact angle θ with a $ddH_2O$ droplet of 90° or more, for instance of about 90° to about 120°. The contact angle may, in specific embodiments, be 90°, 95°, 100°, 105°, 110°, 115°, 120° or any value in between these values. The suitability, i.e. the biofilm's contact angle θ with a $ddH_2O$ droplet, may preferably be tested or determined according to the methodology described herein above, or as outlined in the examples herein below. Suitable bacterial biofilms are further preferably composed on apathogenic bacteria, in particular of non-human apathogenic bacteria. In a further specific embodiment, a suitable bacterial biofilm may be a biofilm which is capable of conveying hydrophobic properties to a cement-based material composition, if added in an amount of about 0.5 wt % to about 20 wt % of the dry weight of the final composition. "Hydrophobic properties of the composition" means that said composition shows a contact angle θ with a $ddH_2O$ droplet of 90° or more, for instance of about 90° to about 120°, more specifically of about 90°, 95°, 100°, 105°, 110°, 115°, 120° or any value in between these values, if said water droplet is placed on a cement-based material composition comprising said bacterial biofilm. The suitability, i.e. the biofilm comprising composition's contact angle θ with a $ddH_2O$ droplet, may preferably be tested or determined according to the methodology described herein, in particular as outlined in the Examples herein below.

A bacterial biofilm according to the present invention may, for example, be composed of gram-positive or gram-negative bacteria, or a consortium of gram-positive and gram-negative bacteria. Examples of biofilm forming gram-positive bacteria envisaged by the present invention are *Bacillus* sp., and lactic acid bacteria such as *Lactobacillus plantarum* or *Lactococcus lactis*. Examples of biofilm forming gram-negative bacteria envisaged by the present invention include the genus *Escherichia*, e.g. *E. coli*, and the genus *Pseudomonas*, e.g. *P. aeruginosa, P. putida* or *P. fluorescence*.

In a preferred embodiment of the invention the bacterial biofilm is a biofilm comprising, essentially consisting of, or consisting of bacteria of the species *Bacillus subtilis*. In specific embodiments, the bacterial biofilm is a biofilm comprising, essentially consisting of, or consisting of wild-type or non-domesticated bacteria, preferably of wildtype or non-domesticated bacteria of the species *Bacillus subtilis*. In a further particularly preferred embodiment of the invention the bacterial biofilm is a biofilm comprising, essentially consisting of, or consisting of bacteria of *Bacillus subtilis* strain NCIB 3610 (herein referred to as *B. subtilis* 3610 wt), which is a non domesticated *B. subtilis* wildtype strain. In a further particularly preferred embodiment of the invention the bacterial biofilm is a biofilm comprising, essentially consisting of, or consisting of bacteria of *Bacillus subtilis* strain natto (herein referred to as *B. subtilis* natto). In a specific embodiment the bacterial biofilm is a biofilm comprising, essentially consisting of, or consisting of bacteria of the species *Bacillus subtilis* with the proviso that strain *B. subtilis* B1 is not comprised. In further preferred embodiments, the bacterial biofilm is a biofilm comprising, essentially consisting of, or consisting of bacteria of the genus *Pseudomonas*. In a particularly preferred embodiment of the invention the bacterial biofilm is a biofilm comprising, essentially consisting of, or consisting of bacteria of the species *Pseudomonas fluorescens*. In yet another particularly preferred embodiment of the invention the bacterial biofilm is a biofilm comprising, essentially consisting of, or consisting of bacteria of the species *Pseudomonas putida*. In specific embodiments, the bacterial biofilm may comprise more than one bacterial strain, species or genus. For example, the bacterial biofilm may comprise a consortium of two or more *B. subtilis* strains, or of two or more *Pseudomonas* species. Further envisaged are consortia which comprise *B. subtilis* and a *Pseudomonas* species, e.g. *P. fluorescens* or *P. putida*. Such consortia may, for example, comprise *B. subtilis* 3610 together with *P. fluorescens* or together with *P. putida*.

In certain embodiments a bacterial biofilm according to the invention comprises, essentially consists of, or consists of bacteria which have been genetically engineered or modified. For example, such a genetic modification may lead to an alteration in the biofilm production and/or an alteration in the expression of hydrophobic extracellular biofilm components and/or an improvement of the amenability of the biofilm or of biofilm components. The term "genetic modification" as used herein means that a bacterium, preferably *B. subtilis* or *Pseudomonas* sp., is altered by any suitable genetic means and methods known to the skilled person in order to change the biofilm production, preferably to increase the biofilm production and/or to change the expression of extracellular biofilm components, preferably to increase the expression of extracellular biofilm components and/or to change, preferably improve, the amenability of the biofilm or of biofilm components. In a preferred embodiment, the term "genetic modification" means that a bacterium, preferably *B. subtilis* or *Pseudomonas* sp., is altered by any suitable genetic means and methods known to the skilled person in order to alter the hydrophobicity, preferably to increase the hydrophobicity of the biofilm, in particular, in order to change the biofilm production, preferably to increase the biofilm production and/or to change the expression of hydrophobic extracellular biofilm components, preferably to increase the expression of hydrophobic extracellular biofilm components. A genetic modification as used in the context of the present invention preferably refers to an approach with which a bacterium, e.g. *B. subtilis* or *Pseudomonas* sp. is provided with a genetic element that, upon its expression in the bacterium, allows for the production of biofilm or biofilm components, and/or the expression of hydrophobic extracellular biofilm components and/or the improve the amenability of the biofilm or of biofilm components.

In one embodiment the bacterial biofilm according to the present invention may be obtained by growing bacteria, e.g. *B. subtilis* strains or *Pseudomonas* species as mentioned herein above, in a liquid culture medium. Any suitable liquid culture known to the skilled person may be used. For example, a basal or complex medium comprising a carbon source such as glucose, fructose or sucrose, water, one or more salts, as well was amino acids sources such as yeast extract, tryptone, peptone, blood, casein hydrolysate or beef extract may be used. A preferred liquid complex medium to be used in the context of the present invention is LB (lysogeny broth) medium, which typically comprises yeast extract, e.g. in a concentration of 5 g/l, tryptone, e.g. in a concentration of 10 g/l and NaCl, e.g. in a concentration of 10 g/l (designated as LB-Miller), of 5 g/l (designated as LB-Lennox), or 0.5 g/l (designated as LB-Luria). The medium may additionally comprise a carbon source such as glucose, e.g. in a concentration of 1 g/l, or sucrose, e.g. in a concentration of 1 g/I. A further preferred liquid complex medium to be used in the context of the present invention is LB plus (LB+) medium, which typically comprises, in addition to the ingredients of the LB medium described above, glycerol, e.g. in a concentration of 1% (vol/vol) and $MnSO_4$, e.g. in a concentration of 0.1 mM. In an alternative embodiment, a 2×SGG liquid medium typically comprising nutrient broth (e.g. in an amount of 1.6 g per 100 ml), KCl (e.g. in an amount of 0.2 g per 100 ml), $MgSO_4$ (e.g. in an amount of 0.05 g per 100 ml), $Ca(NO_3)_2$ (e.g. in concentration of 1 mM), $MnCl_2$ (e.g. in concentration of 0.1 mM), $FeSO_4$ (e.g. in concentration of 1 μM), glucose (e.g. in a amount of 0.1%) and glycerol (e.g. in an amount of 1%) may be used. Bacterial biofilms may be obtained from liquid cultures by growing biofilm forming bacteria as described herein, e.g. *B. subtilis* 3610, at a suitable temperature, e.g. at 30° C., or at 37° C. under shaking or stirring movements for a suitable period of time, e.g. for 8 h, 16 h, 20 h, 24 h, 30 h, 48 h, 56 h or 72 h. Subsequently, formed biofilms may be harvested, e.g. by centrifuging the culture. Typically, harvested biofilms may be used in situ, e.g. as wet compound, e.g. as an aqueous suspension, for a mixture with cement-based material to obtain a composition according to the present invention, or the harvested biofilms may be dried, e.g. lyophilized, in order to provide them in storable and/or conveniently transportable form. In specific embodiment, the lyophilization may be performed for about 20 to 48 h, preferably for about 48 h to ensure complete dryness of the biofilm. In further embodiments, dried bacterial biofilm obtained as described herein above, or freshly harvested biofilm may be further processed by suitable homogenization or powderization steps. For example, it may be crushed and homogenized with pestils or grinded in suitable mills. Further, alternatively usable growth conditions, which are also envisaged by the present invention, would be known to the skilled person or can be derived from suitable literature sources.

In further embodiments, the bacterial biofilm according to the present invention may be obtained by growing bacteria, e.g. *B. subtilis* strains or *Pseudomonas* species as mentioned herein above, on a solid surface. In certain embodiments of the present invention, such solid surfaces may be solid media, in particular agar-based solid media. Preferred solid media are LB agar media, i.e. LB media having a composition as described herein above and additionally comprising a suitable amount of agar, e.g. 1.5% agar. Further preferred are LB plus (LB+) agar media, i.e. LB plus media having a composition as described herein above and additionally comprising 1.5% agar. In further embodiments, 2×SGG agar medium may be used, i.e. 2×SGG medium having a composition as described herein above and additionally comprising a suitable amount of agar, e.g. 1.5% agar. Subsequently, formed biofilms may be harvested, e.g. by scraping the biofilm off the solid surface. In further embodiments, freshly harvested biofilm may be dried, e.g. by lyophilization for about 20 to 48 h, preferably for about 48 h to ensure complete dryness of the biofilm. Subsequently, dried biofilm or freshly harvested biofilm may be further processed by suitable homogenization steps. For example, it may be crushed with pestils or be homogenized with a stand mixture. The homogenization process may further be facilitated by the addition of liquid, e.g. water. Homogenized biofilm compositions may then be mixed with cement-based materials, e.g. mortar or concrete ingredients.

The bacterial biofilm according to the present invention may be provided in any suitable form. For example, the bacterial biofilm may be provided as dry composition or in a wet or natural state, e.g. directly after its harvest. If provided in a dry state, the biofilm may be provided as lyophilized composition, e.g. as described herein above. Dried or lyophilized bacterial biofilms may be stored for an extended period of time, e.g. for 1 to 4 weeks, or for 2 to 12 months in a suitable environment, e.g. at room temperature or at about 4-6° C. in a refrigerator. Preferably, the dried or lyophilized bacterial biofilms may be stored in a dry and sealed container. Bacterial biofilms may alternatively be frozen after harvesting, e.g. at −20° C. or at −70° C. or at any other suitable freezing temperature and kept under such conditions until a mixture with cement-based materials to obtain a hydrophobic cement-based material composition according to the present invention.

The term "hydrophobicity-conveying component of a bacterial biofilm" as used herein refers to any isolatable, fractionable and/or synthesizable element or portion of a bacterial biofilm as defined herein above, preferably of a biofilm of biofilm producing bacteria, more preferably of a biofilm of *B. subtilis* strains or *Pseudomonas* species, even more preferably of a biofilm of *B. subtilis* 3610, which is capable of rendering said biofilm hydrophobic. In specific embodiments, said component is also capable of rendering a cement-based material composition hydrophobic. This capability may be determined or tested according to any suitable methodology, preferably by determination of the contact angle θ between a cement-based material composition comprising said component or fraction and a ddH$_2$0 droplet, e.g. as outlined above or in the Examples herein below. Without wishing to be bound to any theory, it is assumed that hydrophobicity-conveying components of a bacterial biofilm largely reside in the biofilm's extracellular biopolymer matrix. An isolation of a hydrophobicity-conveying portion or element of a bacterial biofilm may, in specific embodiments, be performed according to methods and techniques for isolating extracellular biopolymer matrix components, which would be known to the skilled person. For example, bacterial biofilms may be grown in liquid culture, preferably as described herein above, or may be grown on solid surfaces, e.g. on agar plates, preferably as described herein above. Biofilm material from liquid cultures may subsequently be separated from culture medium by centrifugation, e.g. at 5000 rpm to 15000 rpm for 5 to 20 min. Biofilm material from solid surfaces may be homogenized in an aqueous solution and subsequently be subjected to a centrifugation step, e.g. at 5000 rpm to 15000 rpm for 5 to 20 min. A precipitate accordingly obtained may subsequently be subjected to mild sonication to disrupt biofilm structures, pellicles and cell clusters, followed by a further separation by centrifugation. In a supernatant of this process extracellular biopolymer matrix will be present which may further be fractionated, purified and/or analysed. In a specific embodiment of the invention, a bacterial biofilm fraction comprising the extracellular biopolymer matrix or portions thereof, e.g. obtained as described above, may be considered, or be used, as hydrophobicity-conveying component of the bacterial biofilm. In a preferred embodiment, the extracellular biopolymer matrix comprising supernatant, as described above, or fractions thereof, e.g. a size, weight or charge separated fraction, which may be provided in dried or non-dried form, may be considered, or be used, as hydrophobicity-conveying component of a bacterial biofilm. In alternative embodiments, cellular components, e.g. derived from pellets after a separation process as outlined above, in intact or solubilised form, or any suitable fraction, e.g. a size, weight or charge separated fraction, may be considered or used as hydrophobicity-conveying component of a bacterial biofilm. In further separation processes proteins, preferably present in the matrix fraction, but also in the cellular fraction may, for example, be isolated and/or purified by treatment with trichloroacetic acid. Molecular separation may be based, for example, on size exclusion chromatography, hydrophobic interaction chromatography, ion exchange chromatography, affinity chromatography, immunoprecipitation or immunoaffinity chromatography or high performance liquid chromatography (HPCL) or other suitable techniques. Proteins may further be purified by ultrafiltration. Correspondingly obtained proteins or fractions comprising such proteins may be considered or be used as hydrophobicity-conveying component of a bacterial biofilm according to the present invention. The mentioned methods and techniques, as well as further suitable alternative methods, would be known to the skilled person or can be derived from suitable literature sources such as, for example, GE Healthcare Life Sciences Handbooks which can be found at http://www.gelifesciences.com (accessed on May 20, 2015), or Ahmed, Principles and Reactions of Protein Extraction, Purification and Characterization, CRC Press, 2007. Exopolysaccharides present in the extracellular biopolymer matrix components of a bacterial biofilm may be isolated and separated by subjecting a fraction of the extracellular matrix described herein above to treatment with formaldehyde, then by NaOH, followed by a centrifugation. Subsequently, after an optional dialysis, treatment with TCA and a centrifugation step (e.g. for 1 hour at about 15.000×g) typically provides a supernatant. The supernatant may be treated with ethanol, centrifuged, dialysed, lyophilized and finally be subjected to gel filtration, preferably to an S-200 gel filtration. After a further dialysis step purified polysaccharides may be obtained. Correspondingly obtained polysaccharides or fractions comprising such polysaccharides may be considered, or be used, as hydrophobicity-conveying component of a bacterial biofilm according to the present invention. The mentioned methods and techniques, as well as further suitable alternative methods, would be known to the skilled person or can be derived from suitable literature sources such as P. M. Bales et al., "Purification and Characterization of Biofilm-Associated EPS Exopolysaccharides from ESKAPE Organisms and Other Pathogens", PLoS ONE 8(6): e67950, 2013.

In specific embodiments of the invention, the hydrophobicity-conveying component of a bacterial biofilm is an already known component of a bacterial biofilm, or a combination of such a component with additional compounds or elements. For example, a hydrophobicity-conveying component may be a protein or polypeptide with hydrophobic properties. In a preferred embodiment, the hydrophobicity-conveying component is a protein which confers or contributes to surface repellency of B. subtilis zs biofilms.

An example of such a protein is the BsIA protein (also known as YuaB), which was found to constitute one of the major contributors to B. subtilis surface repellency (Kobayashi and Iwano, Molecular Microbiology, 2012, 85(1), 51-66). In specific embodiments of the present invention, the BsIA protein, or variants thereof, e.g. proteins having a sequence identity of 70%, 75%, 80%, 85%, 90%, 91%, 92%, 93%, 94%, 95%, 96%, 97%, 98%, 99% or more with the sequence of Uniprot sequence identifier A0A063XD50-1 (as defined in the Uniprot database on May 20, 2015) of YuaB, encoded, for example, by gene BS49_34000 (as defined in the Uniprot database on May 20, 2015) over the entire sequence length, or variants comprising one or more amino acid substitutions, deletions or modifications, wherein said variant proteins possess BsIA's repellency activity, e.g. as described by Kobayashi and Iwano, 2012, may be comprised in cement-based material compositions, or be used for the preparation of hydrophobic cement-based material compositions according to the present invention.

A further example of a hydrophobicity-conveying component is protein TasA, which was found as prominent component of B. subtilis extracellular matrix (Branda et al., Molecular Microbiology, 2006, 59(4), 1229-1238). In specific embodiments of the present invention, the TasA protein, or variants thereof, e.g. proteins having a sequence identity of 70%, 75%, 80%, 85%, 90%, 91%, 92%, 93%, 94%, 95%, 96%, 97%, 98%, 99% or more with the sequence of Uniprot sequence identifier Q5ND72-1 (as defined in the Uniprot database on May 20, 2015) of TasA, over the entire sequence length, or variants comprising one or more amino acid substitutions, deletions or modifications, wherein said variant proteins possess TasA's activity, e.g. as described by Branda et al., 2006, may be comprised in cement-based material compositions, or be used for the preparation of hydrophobic cement-based material compositions according to the present invention.

Further examples of hydrophobicity-conveying components of a bacterial biofilm according to the present invention are hydrophobicity-conveying exopolysaccharides present in the extracellular matrix of biofilm producing bacteria, preferably of *B. subtilis*, more preferably of *B. subtilis* 3610. Such exopolysaccharides may comprise, for instance, levan type I and II polysaccharides as well as other polysaccharide types and associated factors. In the context of the present invention, a hydrophobicity-conveying component may not be an exopolysaccharide of the gellan group, e.g. S-60, in particular not an expolysaccharide such as welan (S-130) or diutan (S-657), or stearic acid.

Proteins or expolysacchrides as described herein above may be provided alone or in any suitable combination. For example, BsIA and TsaA may be provided in combination. Furthermore, each of these proteins or both may be provided in combination with an exopolysaccharide as mentioned above. Such combinations may be based on any suitable proportion of components, e.g. proteins or polysaccharides, e.g. 5% of one component and 95% of the other component, 25% of one component and 75% of the other component, or 50% of both components, or any value in between these values. Also envisaged are combinations with biofilm fractions as mentioned herein above.

In further specific embodiments of the present invention hydrophobicity-conveying components of a bacterial biofilm may be combined with protein elements known to convey hydrophobicity in other circumstances or biological systems, or with hydrophobicity-conveying chemical entities, e.g. nanoparticles. For example, fungal hydrophobins, which are low molecular mass (≤20 kDa) secreted proteins of fungi, characterized by moderate to high levels of hydrophobicity and the presence of eight conserved cysteine (Cys) residues and which are typically expressed by filamentous fungi such as *Schizophyllum commune* or *Magnaporthe grisea*, may be used as additional hydrophobicity-conveying component. Also envisaged is the employment of chaplins, SapB or SapT proteins, which are known to convey a similar functionality in *Streptomyces*. Further details would be known to the skilled person or can be derived from suitable literature sources such as Bayry et al., PLOS, 2012, 8(5), e1002700. In further specific embodiments, such hydrophobicity-conveying components known from biological systems as defined above may be used instead of the components of a bacterial biofilm.

The amount of bacterial biofilm or hydrophobicity-conveying components of a bacterial biofilm in a cement-based material composition according to the present invention may be in the range of about 0.5 wt % to about 20 wt % of the dry weight of the final composition, preferably of about 0.5 wt % to about 15 wt % of the dry weight of the final composition, more preferably of about 0.5 wt % to about 10 wt % of the dry weight of the final composition, e.g. in an amount of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20%. The exact amount of bacterial biofilm, preferably provided in a processed form, e.g. as lyophilized biofilm, as described herein above, or provided as isolated, or purified or semi-purified component, e.g. as purified protein or polysaccharide component, that is present in said composition, may depend on factors such as the intended use of the composition, the intended degree of hydrophobicity, i.e. the contact angles to be obtained, the source of biofilm material, the consistency of the material, i.e. whether it is provided as biofilm lyophilisate or as protein preparation, the genetic identity of biofilm producing bacteria or further factors, as the skilled person would be aware of. Under certain circumstances, an increased amount of biofilm material, e.g. lyophilized biofilm material, may reduce the stability of the cement-based material composition. In specific embodiments wherein the bacterial biofilm is provided in lyophilized form, the amount of bacterial biofilm in a cement-based material composition may preferably be in the range of about 3% to about 15%, more preferably in the range of about 5% to about 10%, e.g. in an amount of about 3%, 3.5%, 4%, 4.5%, 5%, 5.5%, 6%, 6.5%, 7%, 7.5%, 8%, 8.5%, 9%, 9.5% or 10%.

The cement-based material composition comprising biofilm material according to the present invention, preferably comprising biofilm material derived from *B. subtilis* 3610 cultures, is easily amenable for typical construction. The cement-based material compositions according to the invention show essentially no decreased stability or strength. It is particularly preferred that the amount of bacterial biofilm or hydrophobicity-conveying components of a bacterial biofilm in a cement-based material composition is about 2%. In a further particularly preferred embodiment, the amount of bacterial biofilm or hydrophobicity-conveying components of a bacterial biofilm in a cement-based material composition is about 2% with a water-to-cement ratio of the composition of about 0.4 to 0.6, more preferably of about 0.5. In further specific embodiments, the amount of bacterial biofilm or hydrophobicity-conveying components of a bacterial biofilm in a cement-based material composition may be in the range of about 3% to about 10%. Such amounts may, for example, be present in case of certain biofilm producing bacteria which produce, under comparable conditions, a self-encapsulating extracellular biopolymer matrix which is reduced, e.g. by 10 to 70% or more in comparison to the self-encapsulating extracellular biopolymer matrix produced by *B. subtilis* 3610. Similarly, such amounts may, for example, be present in case of certain biofilm producing bacteria which produce, under comparable conditions, a biofilm which comprise less hydrophobic components, e.g. 10% to 70% or more less hydrophobic components, in comparison to in comparison to hydrophobic components produced by *B. subtilis* 3610. In yet another embodiment, the amount of hydrophobicity-conveying components of a bacterial biofilm in a cement-based material composition according to the invention may be in the range of about less than 2%, e.g. between about 0.5% to 2%, if exclusively or largely hydrophobicity-conveying components such as polysaccharides, e.g. as defined herein above, or fractions of the biofilm, in particular non-cellular fractions, as defined herein above, are present in the composition. In further embodiments of the present invention, hydrophobic cement-based material compositions as defined herein above, which comprise a bacterial biofilm or at least one hydrophobicitiy conveying component of a bacterial biofilm, preferably in an amount of about 0.5 wt % to about 20 wt % of the dry weight of the final composition, more preferably in an amount of about 0.5 wt % to about 15 wt % of the dry weight of the final composition, e.g. in an amount of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20%, exhibits an increased surface roughness in comparison to a cement-based material composition which does not comprise a bacterial biofilm or at least one hydrophobicity-conveying component of a bacterial biofilm, which rather shows a smooth surface with micro-cracks. The term "increased surface roughness" as used herein means that upon analysis with a suitable imaging technique, e.g. Scanning Electron Microscopy (SEM), or light profilometry, preferably as described in the Examples, the presence of non-smooth or protruding elements in a defined area of the composition, e.g. an area of 1 $\mu m^2$ or 10 $\mu m^2$ is increased by 30%, 40%, 50%, 60%, 70%, 80%, 100% or more than 100% in comparison to a cement-based material composition which does not comprise a bacterial biofilm or at least one hydrophobicity-conveying component of a bacterial biofilm.

In further specific embodiments, hydrophobic cement-based material compositions as defined herein above, which comprise a bacterial biofilm or at least one hydrophobicitiy conveying component of a bacterial biofilm, preferably in an amount of about 0.5 wt % to about 20 wt % of the dry weight of the final composition, more preferably in an amount of about 0.5 wt % to about 15 wt % of the dry weight of the final composition, e.g. in an amount of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20%, exhibits an increased number of pores on its surface. The presence of pores is understood as partial aspect of the increased roughness. The pores may be of an asymmetric shape and may be increased in number by 30%, 40%, 50%, 60%, 70%, 80%, 100% or more than 100% in comparison to a cement-based material composition which does not comprise a bacterial biofilm or at least one hydrophobicity-conveying component of a bacterial biofilm.

In further embodiments of the present invention hydrophobic cement-based material compositions as defined herein above, which comprise a bacterial biofilm or at least one hydrophobicity conveying component of a bacterial biofilm, preferably in an amount of about 0.5 wt % to about 20 wt % of the dry weight of the final composition, more preferably in an amount of about 0.5 wt % to about 15 wt % of the dry weight of the final composition, e.g. in an amount of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5, 15%, 15.5%, 16%, 16.5%, 17%, 17.5%, 18%, 18.5%, 19%, 19.5% or 20% exhibits an increased density of elongated spike-like structures on its surface in comparison to a cement-based material composition which does not comprise a bacterial biofilm or at least one hydrophobicity-conveying component of a bacterial biofilm. The term "increased density of spike-like structures" as used herein means that upon analysis with a suitable imaging technique, e.g. Scanning Electron Microscopy (SEM), or light profilometry, preferably as described in the Examples, the topography of a cement-based material composition shows an elevated number of fibrils which are spike like and have a diameter of about 1 to 10 nm. In the absence of bacterial biofilm components, a smooth surface with micro-cracks is typically seen. In specific embodiments, there may be between about 2 to 30 rod-shaped fibrils per $\mu m^2$ of composition surface, e.g. about 5, 10, 15, 20, 25 or 30 rod-shaped fibrils per $\mu m^2$ of composition surface, in particular of a mortar sample comprising 2% biofilm component. In a cement-based material composition which does not comprise a bacterial biofilm or at least one hydrophobicity-conveying component of a bacterial biofilm the density is significantly reduced, e.g. to about 0.5 to 1 rod-shaped fibrils per $\mu m^2$ of composition surface. In specific embodiments of the invention, hydrophobic cement-based material compositions as defined herein above, which comprise a bacterial biofilm or at least one hydrophobicity conveying component of a bacterial biofilm, preferably in an amount of about 0.5 wt % to about 20 wt % of the dry weight of the final composition, more preferably in an amount of about 0.5 wt % to about 15 wt % of the dry weight of the final composition, e.g. in an amount of about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20% exhibit spike-like structures in about 70 to 90% of the composition's entire surface, e.g. in about 70%, 75%, 80%, 85%, 90% or any percentage value in between these values, of the composition's entire surface. The calculation of coverage by spike-like structures may be based on a division of composition areas of 1000 $\mu m^2$ into 1 $\mu m^2$ squares, which may be analysed consecutively. If any such 1 $\mu m^2$ square is free of any spike-like structures or not covered by these structure, it would be considered as contributing to the non-covered portion, while the presence of already one spike-like structure in a 1 $\mu m^2$ square as defined above renders it a spike-like structure comprising area. The percentage of covered area may thus be obtained by summing up the accordingly obtained information for all 1 $\mu m^2$ squares in the larger 1000 $\mu m^2$ area. This procedure may be performed for 2, 5, 10 or more of consecutive or arbitrarily chosen 1000 $\mu m^2$ areas in order to improve the significance of the result.

Without wishing to be bound to any theory, it is assumed that the changed morphology of the composition surface leads to a lotus leaf like effect on the nano- and microscale, thus drastically increasing the hydrophobicity and reducing the wettability of the composition. The unusual surface morphology which was surprisingly found by the present inventors may possibly be due to premature hydration stop during the cement hydration process conserving the described nanostructures.

In a further aspect the present invention relates to the use of a bacterial biofilm, or of at least one hydrophobicity-conveying component of a bacterial biofilm in the preparation of a hydrophobic cement-based material composition for the preparation of a hydrophobic cement-based material composition. It is preferred that the bacterial biofilm, the at least one hydrophobicity-conveying component of a bacterial biofilm or the cement-based material composition are those defined herein above. Said bacterial biofilm or the hydrophobic components thereof may be used in any suitable manner. The preparation of a hydrophobic cement-based material composition may be performed according to standard protocols for cement-based materials, e.g. standard protocols for mortar or concrete preparation. The bacterial biofilm may be provided as dry, e.g. lyophilized component, or it may be provided as recent harvest, e.g. from bacterial biofilm cultures as described herein, or it may be provided as isolated, or purified or semi-purified component, e.g. as purified protein or polysaccharide component, as defined herein above, or as fraction, e.g. as extracellular-matrix or non-cellular fraction of a bacterial biofilm preparation, as defined herein above. In a preferred embodiment, the bacterial biofilm may be provided in a homogenized form, for example as an aqueous suspension, or as a lyophilized powder. It may be added to the composition during the components mixing phase. It may alternatively be added to the composition together with water. In this embodiment, it may be solubilized in water before the water is added to the cement-based material composition.

In a further aspect the present invention relates to the use of a bacterial biofilm, or of at least one hydrophobicity-conveying component of a bacterial biofilm for decreasing the wettability of a cement-based material composition. The term "wettability" as used herein relates to the composition's property to allow ingress of liquid, e.g. water, into the composition's non-surface layers. It relates to the degree of wetting of a material, e.g. a composition as defined herein. Wettability is, similar to hydrophobicity, measured by the determination of a contact angle θ between said composite and droplet of liquid, e.g. water, salt-water or an alcohol-water mixtures, as defined herein above in the context of hydrophobicity. The term "decreasing wettability" as used herein means that the degree of wetting of a cement-based material composition, e.g. a mortar, concrete or lime cement plaster composition, which does not comprise bacterial biofilms according to the present invention, or a component thereof, as determined by its contact angle θ with a droplet of ddH$_2$O, is decreased by at least 10%, 20%, 30%, 40%, 50%, 60%, 80%, 100% or more. Accordingly, the contact angle θ with a droplet of ddH2O may be increased to at least above 90°, preferably to more than 90°, e.g. 100°, 120°, 140° or more or any value in between these values. The wettability of cement-based material composition may be determined by the amount of bacterial biofilm or hydrophobicity-conveying components of a bacterial biofilm present in the composition. For a low to moderate decrease of wettability, an amount of about 0.5 to about 1% of bacterial biofilm, e.g. produced and processed as described herein above, may be added to cement-based materials. For a medium to high decrease of wettability, an amount of about 1% to about 2% of bacterial biofilm, e.g. produced and processed as described herein above, may be added to cement-based materials. For a very high decrease of wettability an amount of 2% to about 3% or more of bacterial biofilm, e.g. produced and processed as described herein above, may be added to cement-based materials.

In yet another aspect, the present invention relates to a method for rendering a cement-based material composition hydrophobic. The method comprises as central step the addition of an effective amount of a bacterial biofilm to a cement-based material, thus providing a cement-based material composition, which is hydrophobic. Alternatively, at least one hydrophobicity-conveying component of a bacterial biofilm to a cement-based material composition may be added to said cement-based material, thus providing a cement-based material composition, which is hydrophobic. Hydrophobicity of the resulting composition may be tested as described herein above, or in the Examples, below. In particular, hydrophobicity may be assessed by determining the contact angle θ of the composition with a droplet of liquid, e.g. water, salt water of an alcohol-water mixture as described above. It is preferred that the contact angle θ between a hydrophobic composition obtainable by the method and a droplet of water, salt water or an alcohol-water mixture as defined herein above, is about 90° or more, e.g. about 90° to about 150°. It is further preferred that the bacterial biofilm, the at least one hydrophobicity-conveying component of the bacterial biofilm or the cement-based material composition are those defined herein above. The step of adding said bacterial biofilm or said hydrophobicity-conveying components to cement-based material may, in one embodiment, be performed during the cement-based material components' mixing phase, e.g. in a dry state. In this embodiment, bacterial biofilm or hydrophobicity-conveying components thereof may be provided in dry form, preferably in powderized form, e.g. as lyophilized and processed component, e.g. as described herein above. Alternatively, the bacterial biofilm or hydrophobicity-conveying components thereof may be provided as recent harvest, e.g. from biofilm cultures as described herein above. In this form, the bacterial biofilm or hydrophobicity-conveying components may be added as paste or pulp. In different embodiments, purified or semi-purified components, e.g. purified protein or polysaccharide components, as defined herein above, may be added to the cement-based materials' mixture. Alternatively, or in addition to the dry mixing step outlined above, bacterial biofilm or hydrophobicity-conveying components thereof may be added to the cement-based material (present as dry components) together with water. In this context, bacterial biofilm or hydrophobicity-conveying components thereof, which may previously be present as dry components, e.g. in powderized or lyophilized form, or as paste or pulp, may be solubilized in water before said water is added to the cement-based material. The present invention further envisages the provision of solutions comprising biofilm or hydrophobicity-conveying components thereof in suitable containers such as plastic bags or cans, e.g. ready for use in mixing activities, e.g. on construction sites. The method of the invention may further be combined with additional steps which allow to increase the hydrophobicity of the mentioned composition. Such steps are, for example, the additional coating of the surface of the finished composition with a hydrophobic layer, e.g. applying chemical or biological elements such as the employment of nanocoating solutions or nanocoating sprays, or the employment of alkoxysilanes, alkoxysiloxanes, alkali siloconates or silicones. The mentioned methods and techniques would be known to the skilled person or can be derived from suitable literature sources such as, for example I. Flores-Vivian et al., "Self-assembling particle-siloxane coatings for superhydrophobic concrete", ACS Appl. Mater. Interfaces, 2013.

Further envisaged by the present invention are hydrophobic cement-based compositions obtainable by or obtained by the any of the methods for rendering cement-based material compositions hydrophobic, as described above.

The following examples and figures are provided for illustrative purposes. It is thus understood that the example and figures are not to be construed as limiting. The skilled person in the art will clearly be able to envisage further modifications of the principles laid out herein.

EXAMPLES

Example 1

Biofilm Formation and Admixture Preparations

Figure 4:
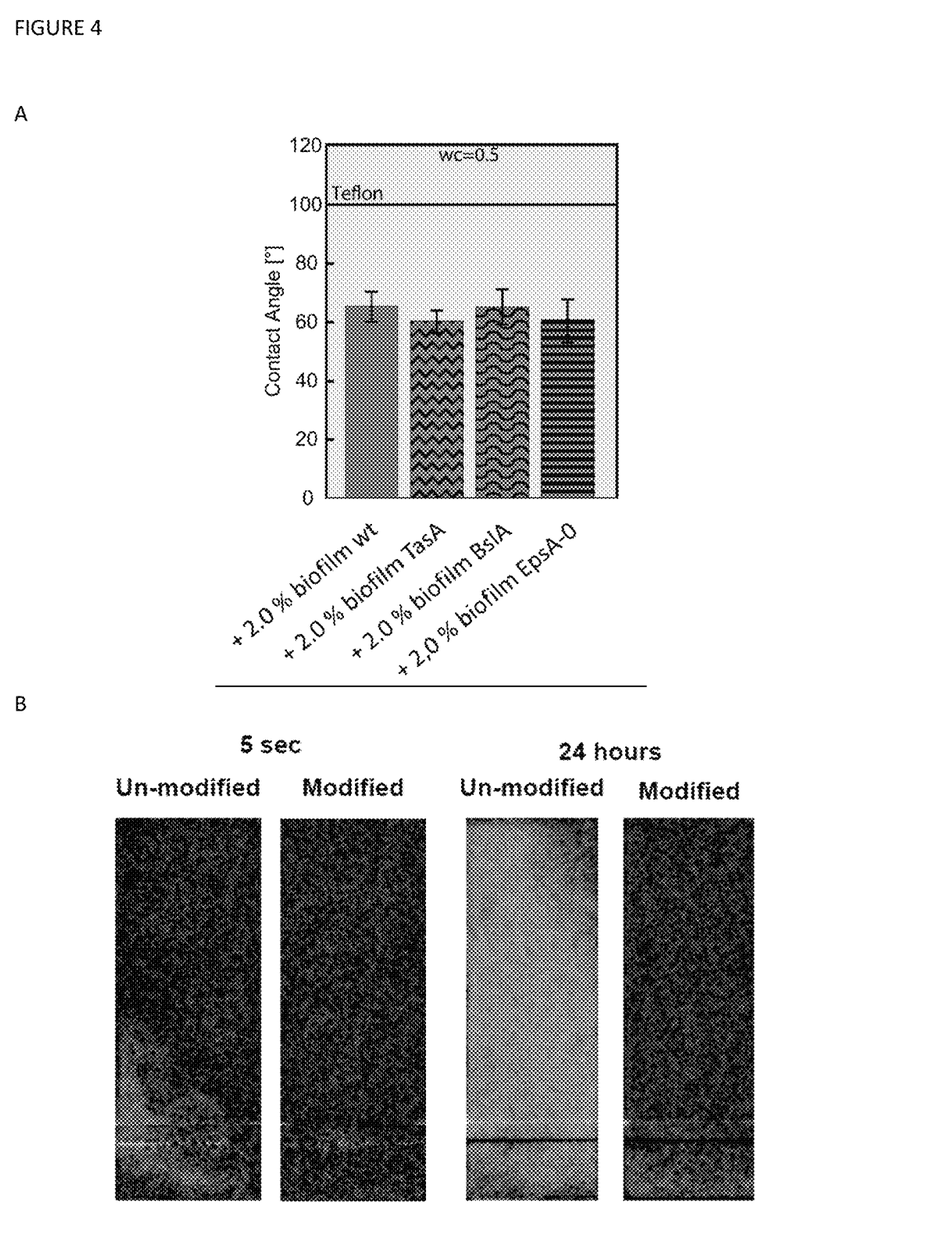
FIG. 4A depicts results of tests regarding fluid droplet contact angles on different biofilm-enriched mortar samples. For the test the *B. subtilis* mutant strains TasA. BsIA and EpsA-0 are used. When *B. subtilis* mutant strains are used instead of *B. subtilis* wt, the hydrophobic properties of the hybrid mortar samples are maintained.
FIG. 4B shows the capillary up rise of water into unmodified standard mortar and hydrophobic hybrid mortar after 5 seconds and 24 hours. The light grey colour depicts the rise of the water within the materials. The tests show that the capillary up rise of water into hybrid mortar is greatly decreased compared to unmodified standard mortar.

*B. subtilis* 3610 wt strain was used for the hybrid-mortar sample preparation. Overnight cultures of the strain were grown from a frozen glycerol stock in 15 ml LB (Luria/Miller) medium at 37° C. and 90 rpm in a shaking incubator (Certomat BS-1, Sartorius AG, Gottingen, Germany) for 16 hours. The bacterial suspension was then plated in 100 μl volumes onto 1.5% (w/v) agar plates containing LB (Luria/Miller) or LB plus (LB+) (Luria/Miller with additional 1% [vol/vol] glycerol and 0.1 mM MnSO$_4$ (adapted from M. Shemesh and Y. Chaia, A combination of glycerol and manganese promotes biofilm formation in *Bacillus subtilis* via histidine kinase kind signalling, Journal of Bacteriology, 2013). Biofilm was grown by incubating the primed agar plates at 37° C. for 24 hours (cultivating and biofilm growth process adapted from S. Grumbein, M. Opitz, and O. Lieleg, "Selected metal ions protect *Bacillus subtilis* biofilms from erosion," Metallomics, 2014). For the experiments with *B. subtilis* knock-out mutants as shown in FIG. 4A, the biofilm growth procedure was identical to that of the wild type 3610 strain, with the exception that a suitable antibiotic was added to the LB medium to select for the respective mutant bacteria during bacterial growth (see Table 1 published in Kesel et al., Carbohydrate Coating Reduces Adhesion of Biofilm-Forming *Bacillus subtilis* to Gold Surfaces, Appl. Environ. Microbiol, 2014.)

Liquid *B. subtilis* Biofilm Admixture

Grown biofilm was scraped off the agar plates and portioned according to a pre-defined weight ratio ($\beta$):

$$\beta = \frac{m_{Biofilm}}{m_{Sand/Cement}}, \left[\frac{g}{g}\right] \quad [\text{Eq. 4}]$$

Here, $m_{Biofilm}$ is the mass of the scraped off biofilm and m Sand/Cement the dry sand/cement grain mixture (pre-mixed as described herein below). Values of $\beta$ used for the admixture were 1%, 2%, and 2.5%. The biofilm portions ($m_{Biofilm}$) were then placed in a homogenizer with double-distilled water (ddH$_2$O) and homogenized for 2 minutes at 1600 rpm with a stand mixer (Stirrer ES, Velp Scientifica, Bohemia, USA). After homogenization the biofilm-ddH$_2$O liquid resulted in the finished admixture for the dry sand/cement grains. The admixtures were prepared with three different w/c ratios (0.5; 0.6; and 0.7).

Dry *B. subtilis* Biofilm Admixture

Grown biofilm was scraped off the LB enriched agar plates and placed into a lyophilizer (Christ Alpha 1-2 LD, Osterode am Harz, Germany) for approx. 48 hours to ensure complete drying out of the biofilm. The left over dry biomass amounted to approx. 20% of the fresh biomass. This was calculated by measuring the weight before and after lyophilizing the biofilm. The dry biofilm was then placed in a 15 ml centrifuge tube and crushed with a stainless-steel pestle until powderized. In order to compare the liquid and dry admixture, the finished hybrid-mortar of both had to have the same amount of biopolymers in it. For this, $m_{Biofilm}$ from Eq. 4 was multiplied by a factor of 0.2, giving the mass of the dry admixture. All samples mixed with the dry admixture had a set w/c ratio of 0.5.

The hybrid-mortar samples were prepared according to V. D. Z. e.V. Forschungsinstitut der Zementindustrie, Zement-Taschenbuch 51$^{st}$ ed. vdz Deutsche Zementindustrie, 2008, with a standard 3:1 weight ratio of sand and cement powder, i.e. 10 g of cement (Heidelbergcement CEM I 42.5 N, Heidelberg, Germany) were supplemented with 30 g of sand (standardized by DIN EN 196-1). After the addition of the admixture (dry or liquid), the viscous hybrid-mortar was stirred for 2 minutes and subsequently poured in custom-made Teflon molds. The molds were then shaken on a shaker plate (Promax 1020, Heidolph, Schwabach, Germany) for 30 seconds, allowing the wet mortar to settle and lose remaining air bubbles, trapped inside the paste. Hydration time of the samples in the mold amounted to approx. 70 hours before contact angles were measured on the underside (the air tight, flat Teflon-mortar interface) of the samples.

Example 2

Determination of Hydrophobic Properties

Hydrophobicity of the hybrid-mortar was examined by different principles (for volume and surface characterization), aiming to quantify the overall interaction behaviour with water. A contact angle measurement setup, scanning electron microscopy (SEM) and a profilometer aimed to elucidate the hydrophobic surface properties of the hybrid-mortar. Volume properties of the hybrid-mortar were examined through water flow rates, both pressurized and static.

Contact Angle Measurement

The contact angle formation on the hybrid-mortar surface was quantified by a contact angle measurement setup. The setup consisted of a perimeter stand with a camera mount, adjustable on the vertical and horizontal axis. A camera (Flea3, Point Grey, Richmond, Canada) with a high resolution Varifocal lens was mounted onto the perimeter stand. Light was directed from above with a slight declination, for optimal lighting conditions. A volume of 20 µl ddH$_2$O was pipetted onto the surface of the hybrid-mortar three times with a 3-5 mm spacing, between each droplet across the diameter. Immediately after the droplets were pipetted onto the surface, the first picture (at 0 minutes) was recorded. The picture spread has a 5 minute interval between each recording, documenting the contact angle behaviour over time. Pictures were taken with provided software (FlyCapture, Point Grey, Richmond, Canada). To obtain the contact angle data, editing was done with ImageJ and a plug-in tool by drop shape analysis (adapted from A. Stalder, G. Kulik, D. Sage, L. Barbieri, and P. Hofmann, A snake-based approach to accurate determination of both contact points and contact angles, Colloids and Surfaces A: Physicochemical and Engineering Aspects, 2006). Here, the contour of the droplet was traced with a spline tool, which resulted in an automatic output of the contact angle at the three-phase junction. The data was analyzed using MatLab (MathWorks, Inc., Natick, USA). All contact angle measurements were conducted at room temperature.

Scanning Electron Microscopy

Images of both hybrid- and standard-mortar sample surfaces were taken with a scanning electron microscope (SEM) and the provided software (JEOLJSM-6060LV, JEOL USA, Inc., Peabody, USA), at various magnifications and acceleration voltages.

Profilometer

A profilometer (µSurf, NanoFocus AG, Oberhausen, Germany) was used to scan the surface (a 200 µm segment) of both hybrid- and standard-mortar samples in order to quantify the roughness. The roughness of the surface was evaluated after measuring by the provided software (µSaft, NanoFocus AG, Oberhausen, Germany) and additionally processed in MatLab.

Water Flow Rate Measurement—Graduated Cylinder Flow Rate Measurement

The bottom of a graduated cylinder was removed and situated on top of a mortar sample. The sample and the cylinder were sealed and fastened by Parafilm in the first set of experiments. After a number of experiments, the sealing method was improved with putty and Parafilm. The cylinder-mortar-conjunction was then situated in an upright position, filled with 170 ml of ddH$_2$O and additionally sealed on top, to minimize evaporative ddH$_2$O loss. The fluid throughput was noted after 24 hours.

Water Flow Rate Measurement—Pressurized Water Flow Rate Measurement

The hybrid-mortar samples were primed with a truncated 15 ml centrifuge tube embedded into the sample during the casting process. After solidification of a sample, 10 ml of ddH2O was filled into the embedded centrifuge tube. A nitrogen (N$_2$) cylinder was then connected via tube and nozzle to the open-ended centrifuge tube. The N$_2$ cylinder was turned on and the inside of the centrifuge tube was pressurized (with p2=2 bar). The constant pressure generated by the $N_2$ cylinder generated system work on the fluid and forced it through the porous microstructure of the mortar samples. This method enabled a faster acquisition of data and simulated a higher fluid pressure.

Example 3

Hydrophobic Hybrid-Mortar with *B. subtilis* 3610 Wild Type

When grown on $LB^{plus}$-enriched agar, the bacterial strain *Bacillus subtilis* 3610 forms biofilms (BF) with strong hydrophobic surface properties similar to what was described before for MSgg agar (A. K. Epstein et al., Bacterial biofilm shows persistent resistance to liquid wetting and gas penetration, PNAS 108(3), 995-1000 2011). Those hydrophobic properties can be quantified by determining the contact angle θ, i.e. the angle formed at the three-phase junction of a water drop which is placed onto the solid surface. For a drop of 20 mL $ddH_2O$, a very high contact angle in the range of $\theta_{BF,LBplus} \approx 110°$ was found (see FIG. 1) which is comparable to the contact angle obtained for water on Teflon. In contrast, an unmodified mortar (UM) sample with a water/cement ratio of wc=0.5 showed strongly hydrophilic behaviour with a contact angle of $\theta_{UM}=30°$.

Figure 1:
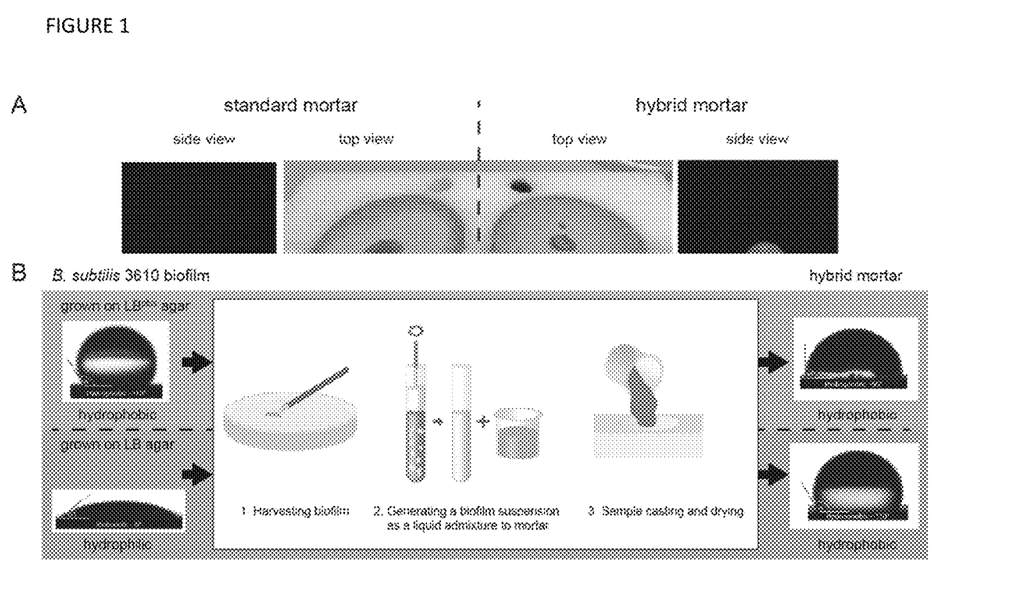
FIG. 1 shows that the wetting resistance of mortar is increased by adding *B. subtilis* biofilm to the mortar mix.

In order to test whether the strong hydrophobic property of the biological material could be transferred to a technical material such as mortar by integrating the biofilm component into the mortar thus creating a hybrid-material with enhanced material properties, biofilm was harvested from agar plates by manual scraping. Subsequently, an aqueous biofilm suspension was generated with a pestle. This suspension was used as an admixture during the mortar casting process (see FIG. 1(B)). It was found that such a hybrid-mortar (HM) sample enriched with 2% ($w_{wet}/w_{dry}$) biofilm exhibited a strongly increased contact angle of $\theta_{HM,LBplus} \approx 90°$ which renders the material slightly hydrophobic. Here, the biofilm content (bc) describes the ratio of wet biofilm mass in the liquid suspension with respect to the dry mass of the inorganic mortar component. The $LB^{plus}$-agar used for biofilm growth was enriched with 1% glycerol and 0.1 mM $MnSO_4$ For industrial applications, it would be helpful if the same effect could be achieved with a *B. subtilis* 3610 biofilm that has been grown on simple LB-agar which is easier and cheaper to produce. However, biofilm grown on this simple LB-agar typically shows a more hydrophilic behavior with usual contact angles in the range of $\theta_{BF,LB} \approx 35°$, and only small areas of this biofilm variant possess strong hydrophobic properties. Consequently, one might expect that a hybrid-mortar sample enriched with this biofilm variant would, if at all, only show a weak enhancement in its wetting resistance. Surprisingly, this is not the case, since contact angles that are comparable, or even higher than when the LB+-grown biofilm is used as an admixture, were observed (see FIG. 1(B)). These results demonstrate that the increased wetting resistance of the hybrid-mortar does not directly arise from the hydrophobic properties of the supplement.

Example 4

Surface Analysis of the Hybrid-Mortar

From the given results, the assumption can be made that the hydrophobic properties of the hybrid-mortar are a surface property. This hypothesis was tested by visualizing the surface of the hybrid-mortar by SEM and comparing it to unmodified mortar. A high density of elongated, spike-like structures on the hybrid-mortar could be observed (see FIG. 2(A)) which cover the whole surface. In contrast, those structures only occur at a few spots in the unmodified mortar samples where they form "hedgehog"-like motifs with much longer spikes, so called ettringites (V. D. Z. e.V. Forschungsinstitut der Zementindustrie, Zement-Taschenbuch, $51^{st}$ ed, vdz Deutsche Zementindustrie, 2008).

Figure 2:
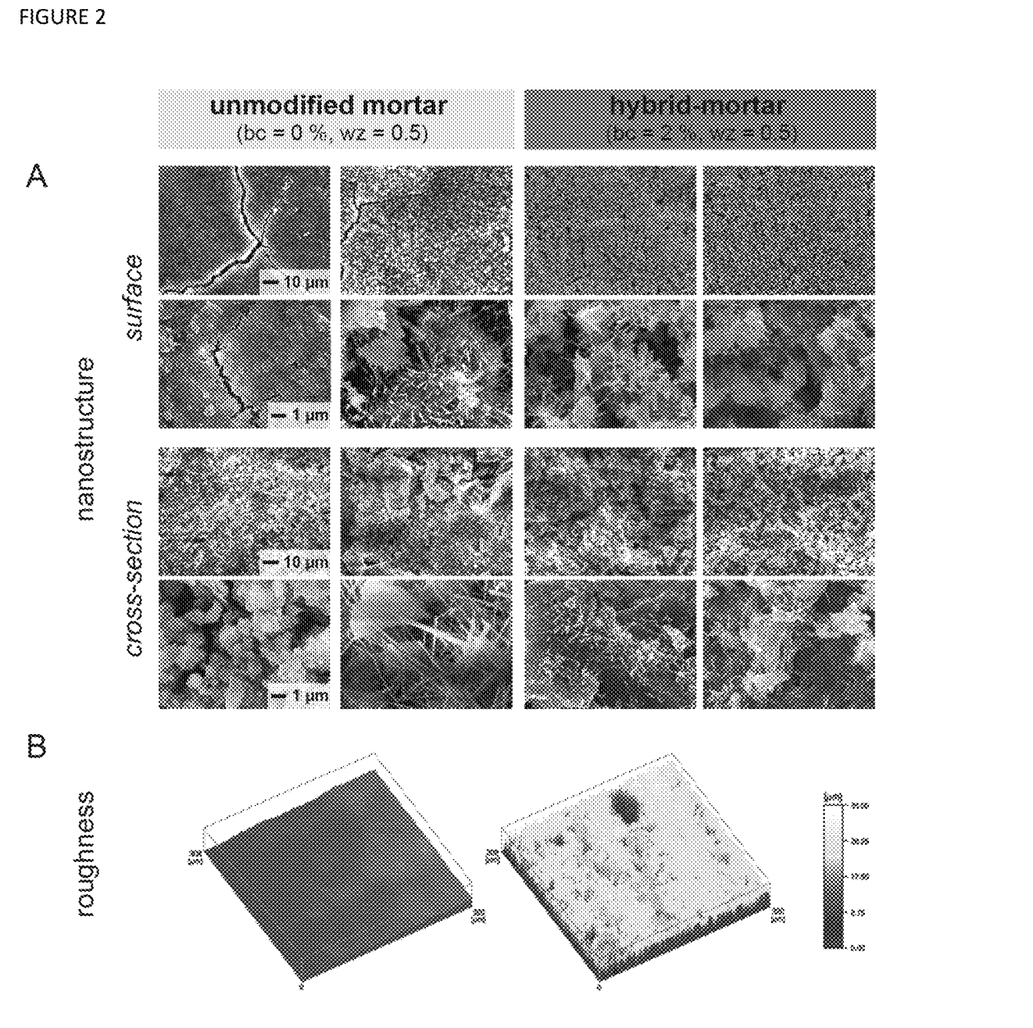
FIG. 2 illustrates the micro- and nanoroughness both on the surface and in the bulk volume of hybrid mortar and unmodified mortar; the hybrid-mortar shows a strongly increased micro- and nanoroughness both on the surface and in the bulk volume. Scanning electron microscopic (acquired on an JEOLJSM-6060LV, JEOL USA, Inc. Peabody, USA.

The lotus leaf possesses roughness features both on the nano- and microscale. However, SEM mostly probes the nanostructure of a surface. To assess whether the hybrid material also shows increased roughness on a microscopic length scale, light profilometry was used as a complementary technique that reports the surface topology on a microscale. With this technique a strong surface alteration for the hybrid mortar with increased roughness features could be detected (see FIG. 2 (B)). Very similar structural alterations could also be observed when the samples were cut vertically and the surface structure of the generated bulk surface was analyzed (see FIG. 2 (A)). This finding is in agreement with the approach used to modify the mortar material by homogeneously adding a biological component to the whole bulk volume during the sample casting process.

Example 5

Volume Analysis of the Hybrid-Mortar

Figure 3:
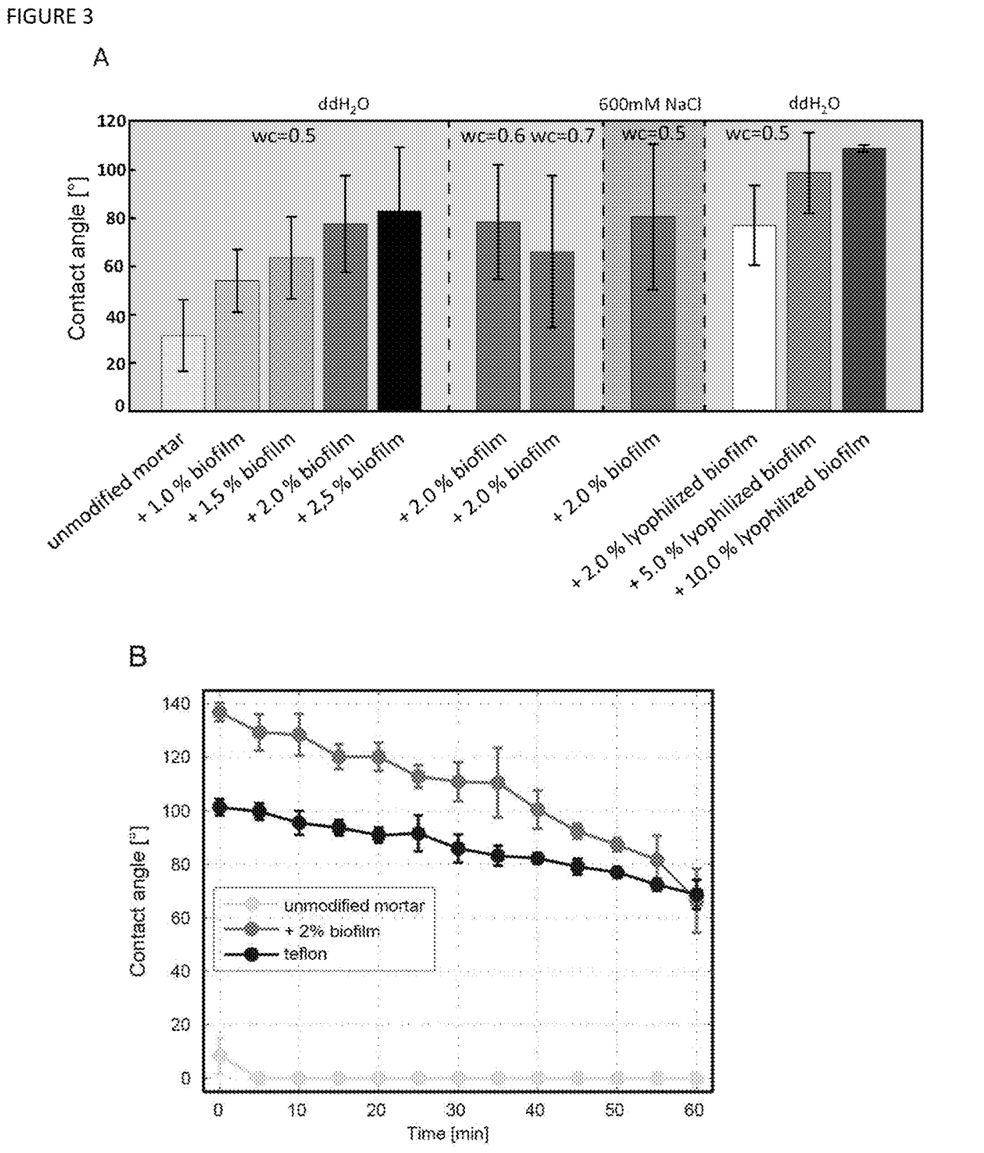
FIG. 3 depicts results of tests regarding fluid droplet contact angles on different biofilm-enriched mortar samples.

Subsequently, it was tested which biofilm/mortar mix yields the highest wetting resistance. For this purpose, two independent parameters were modified: first, the biofilm content (bc) and, second, the water-to-cement ratio (wc). First, 2% ($w_{wet}/w_{dry}$) of biofilm were added to a mortar mix with wc=0.5. In a next step, the contact angle of water on hybrid-mortar samples was determined with lower and higher biofilm contents, i.e. bc=1%, 1.5%, 2%, 2.5% and 3%, as well as 2%, 5% and 10% with lyophilized biofilm material. Among the mechanically stable samples, the highest contact angles were obtained for bc=2% (see FIG. 3(A)). Furthermore, it was observed that with freshly harvested biofilm material the bc=3% sample is difficult to cast into a rigid material anymore as it becomes very brittle and crumbles easily. However, with lyophilized biofilm material this problem does not arise.

On the basis of the results described above, different water-to-cement ratios for a fixed biofilm content of 2% were compared. In industrial applications, this wc-value typically ranges from 0.5 to 0.7. A similar range was explored here. When wc was increased from 0.5 to 0.6 or 0.7, the contact angle on the hybrid mortar remained comparable to the previous results (see FIG. 3(A)). From this set of experiments, it was concluded that the parameters that had initially been chosen yielded the highest contact angle that is accessible within a reasonable parameter range.

Example 6

Stability Over Time

In additional experiments, it was investigated whether the high contact angles observed was stable over a longer period of time. The above described wetting experiments were repeated and single water drops were monitored for a time span of 60 min. This time interval was chosen such that water evaporation could not compromise the contact angle measurement too severely. In unmodified mortar samples the water drop fully wetted the material surface after only 5 minutes (see FIG. 3(B)). In contrast, on the hybrid mortar sample, the drop was stable for the whole observation period; for some samples, even contact angles could be found that exceeded the corresponding values obtained on Teflon (see FIG. 3(B)).

Example 7

Wetting Resistance Towards Sea Water

In further experiments, an additional feature which is important for the hybrid material to be used in civil engineering, was tested. In particular, a high wetting resistance not only towards fresh water but also towards sea water would be crucial either in coastal construction settings or during winter when salt containing splash water wets concrete structures. It was found that that for hybrid material as described above, the contact angle of a 600 mM NaCl solution (representing sea water) was equally high than the contact angle of a simple ddH$_2$O droplet.

Example 8

Dry Admixture

Further, for a potential production process of the hybrid mortar according to the invention in larger quantities it would be extremely convenient if the biological component could be added as a dry or lyophilized powder. This would decouple the production process of the biomass from the actual mortar sample casting process. Therefore, the harvested biofilm was freeze-dried and this biofilm powder was used in re-suspended form as an admixture during the mortar casting process. Accordingly, a hybrid material with comparable hydrophobic properties as when freshly harvested biofilm is used could be obtained (see FIG. 3A). It can be seen, that the addition of higher lyophilized biofilm contents, i.e. bc=2%, 5% and 10%, provide high contact angles (see FIG. 3(A)). The above described results clearly indicate the great potential the herein described biological hybrid-materials hold for industrial applications.

Example 9

Capillary Action

Water capillary uptake experiments were carried out with rectangular block mortar specimens using X-ray dark-field imaging for water visualization. The Setup was equipped with a commercial microfocus tube which was operated at 60 kV and a power of 100 W. A standard flat-panel detector with a pixel-size of 127 μm and a CsI scintillator was used for image acquisition. The interferometer consisted of source-, a phase- and an analyzer grating which were symmetrically aligned along the beam axis.

The invention claimed is:

1. A hydrophobic cement-based material composition, wherein said composition comprises a bacterial biofilm, or at least one hydrophobicity-conveying component of a bacterial biofilm, wherein said bacterial biofilm is a biofilm comprising bacteria selected from the group consisting of *Bacillus subtilis, Pseudomonas, Bacillus subtilis* 3610 wt, *Bacillus subtilis* natto, *Pseudomonas fluorescens*, and *Pseudomonas putida*, and wherein said bacteria are genetically modified to (i) alter biofilm production, (ii) alter expression of hydrophobic extracellular biofilm components or (iii) improve amenability of the biofilm or of biofilm components.

2. The composition of claim 1, wherein the amount of bacterial biofilm in the cement-based material composition is from about 0.5% to about 10% of the dry weight of the composition.

3. The composition of claim 1, wherein said bacterial biofilm has been obtained by growing bacteria in a liquid culture medium, or on solid surfaces, and wherein said obtained bacterial biofilm is optionally lyophilized.

4. The composition of claim 1, wherein said hydrophobic cement-based material composition is hydrophobic vis-a-vis soft water, salt water and/or alcohol-water mixtures, and forms a contact angle θ with a droplet of soft water, salt water or an alcohol-water mixture of about 90° or more.

5. The composition of claim 1, wherein said hydrophobic cement-based material composition comprises a material selected from the group consisting of a mortar, a hydraulic concrete, a non-hydraulic concrete, and a lime cement plaster.

6. The composition of claim 1, wherein said hydrophobic cement-based material has a water-to-cement ratio (wc) of about 0.3 to about 0.7.

7. The composition of claim 1, wherein said hydrophobic cement-based material has a water-to-cement ratio of about 0.5.

8. The composition of claim 1, wherein the amount of bacterial biofilm in the cement-based material composition is about 2% of the dry weight of the composition.

9. A method for rendering a cement-based material composition hydrophobic, comprising: adding an amount of a bacterial biofilm, or of at least one hydrophobicity-conveying component of a bacterial biofilm to the cement-based material composition, wherein the amount is sufficient to render the cement-based material composition hydrophobic.

10. The method of claim 9, wherein the amount of bacterial biofilm in the cement-based material composition is from about 0.5% to about 10% of the dry weight of the composition.

11. The method of claim 9, wherein said bacterial biofilm is a biofilm comprising bacteria selected from the group consisting of *Bacillus subtilis, Pseudomonas, Bacillus subtilis* 3610 wt, *Bacillus subtilis* natto, *Pseudomonas fluorescens*, and *Pseudomonas putida*.

12. The method of claim 11, wherein said bacteria are genetically modified to (i) alter biofilm production, to (ii) alter expression of hydrophobic extracellular biofilm components or (iii) to improve amenability of the biofilm or of biofilm components.

13. The method of claim 9, wherein said bacterial biofilm has been obtained by growing bacteria in a liquid culture medium, or on solid surfaces and wherein said obtained bacterial biofilm is optionally lyophilized.

14. The method of claim 9, wherein said hydrophobic cement-based material composition is hydrophobic vis-a-vis soft water, salt water and/or alcohol-water mixtures, and forms a contact angle θ with a droplet of soft water, salt water or an alcohol-water mixture of about 90° or more.

15. The method of claim 9, wherein said hydrophobic cement-based material composition comprises a material selected from the group consisting of a mortar, a hydraulic concrete, a non-hydraulic concrete, and a lime cement plaster.

16. The method of claim 9, wherein said hydrophobic cement-based material has a water-to-cement ratio of about 0.3 to about 0.7.

17. The method of claim 9, wherein said hydrophobic cement-based material has a water-to-cement ratio of about 0.5.

18. A method for decreasing the wettability of a cement-based material composition, comprising adding a bacterial biofilm, or at least one hydrophobicity-conveying component of a bacterial biofilm to the cement-based material composition, wherein the wettability of the cement-based material composition is decreased compared to the wettability of a cement-based material composition lacking the bacterial biofilm or the at least one hydrophobicity-conveying component of a bacterial biofilm.

* * * * *